United States Patent

Miyaoh

Patent Number: 5,165,372
Date of Patent: Nov. 24, 1992

[54] STEEL LAMINATE TYPE CYLINDER HEAD GASKET

[75] Inventor: Yoshio Miyaoh, Tokyo, Japan

[73] Assignee: Ishikawa Gasket Co., Ltd., Tokyo, Japan

[21] Appl. No.: 809,177

[22] Filed: Dec. 18, 1991

Related U.S. Application Data

[63] Continuation-in-part of Ser. No. 762,777, Sep. 20, 1991.

[30] Foreign Application Priority Data

Dec. 21, 1990 [JP] Japan .............. 2-401395[U]
Dec. 21, 1990 [JP] Japan .............. 2-401396[U]
Dec. 21, 1990 [JP] Japan .............. 2-401397[U]

[51] Int. Cl.⁵ ............................. F02F 1/00
[52] U.S. Cl. .................. 123/193.3; 123/193.5; 277/235 B; 277/236
[58] Field of Search ........... 123/193.3, 193.2, 193.5; 277/235 R, 235 A, 235 B, 227, 180, 236

[56] References Cited

U.S. PATENT DOCUMENTS

| | | | |
|---|---|---|---|
| 4,519,619 | 5/1985 | Doyle | 277/235 B |
| 4,776,602 | 10/1988 | Gallo | 277/235 B |
| 4,781,389 | 11/1988 | Beyer et al. | 277/235 B |
| 4,791,897 | 12/1988 | Udagawa | 277/235 B |
| 4,803,965 | 2/1989 | Udagawa | 123/193.3 |
| 4,898,396 | 2/1990 | Udagawa | 277/236 |
| 4,998,741 | 3/1991 | Udagawa | 277/236 |
| 5,078,413 | 1/1992 | Miyaoh | 277/236 |

Primary Examiner—E. Rollins Cross
Assistant Examiner—M. Macy
Attorney, Agent, or Firm—Kanesaka and Takeuchi

[57] ABSTRACT

A steel laminate type cylinder head gasket is installed in an engine having a cylinder block with a cylinder bore, a cylinder head with an auxiliary combustion chamber and a mouth plate attached to the cylinder head. The gasket is formed of first and second plates laminating together, a compressible member and a sealing device for sealing around the cylinder bore. The first plate includes a hole adjacent the cylinder bore. The hole is located under a part of the mouth plate to form an elongated strip between the hole and the cylinder bore. The compressible member is situated inside the hole to support the mouth plate. A supporting device is also formed at the elongated strip to support the mouth plate together with the wire ring. Accordingly, damage by movement of the mouth plate is substantially prevented.

12 Claims, 3 Drawing Sheets

STEEL LAMINATE TYPE CYLINDER HEAD GASKET

CROSS REFERENCE TO THE RELATED APPLICATION

This is a continuation in part application of U.S. patent application Ser. No. 762,777 filed on Sep. 20, 1991.

BACKGROUND OF THE INVENTION AND RELATED ART STATEMENT

The present invention relates to a steel laminate type cylinder head gasket for an internal combustion engine with an auxiliary combustion chamber.

In an engine with an auxiliary combustion chamber, a cylinder head is provided with a mouth plate to close the auxiliary combustion chamber. When the engine is operated, gas at first combusts at the auxiliary combustion chamber, and then gas at a cylinder bore combusts. Therefore, the mouth plate receives combustion pressure from both the auxilary combustion chamber and the cylinder bore.

As shown in FIGS. 1 and 2, a cylinder head J is provided with a depression K, to which a mouth plate L is inserted, so that an auxiliary combustion chamber M is defined inside the depression K. A gasket 10 is installed between the cylinder head J and a cylinder block P to seal therebetween. The mouth plate L is supported partly by a portion N of the gasket 10.

As stated above, when the engine is operated, combustion pressure is applied to the mouth plate L, so that large pressure is applied to the portion N of the gasket. Sometimes, the mouth plate L moves up and down.

In the conventional steel laminate gasket 10 as shown in FIGS. 1 and 2, the gasket 10 is formed of an upper plate, lower plate and three middle plates. A wire ring is installed around the cylinder bore Hc. Since the gasket 10 does not resiliently support the mouth plate, combustion gas is liable to leak through the mouth plate.

In order to resiliently support the mouth plate, one of the middle plate is replaced by a plate 11 with beads 12 at the portion N of the gasket, which is disclosed in Japanese Patent Publication (KOKAI) No. 59-90745.

In U.S. Pat. Nos. 4,791,897, 4,803,965 and 4,809,653, one of the middle plates is provided with different kind of beads on and around the portion N to support the mouth plate L and seal therearound.

The gaskets as proposed by the patents operate as intended. However, in case the portion N of the gasket need not be compressed strongly by beads, the portion of the middle plate where the beads are formed is cut, to which a compressible material is disposed for supporting the mouth plate L.

When the engine is started, large force is applied to the mouth plate L to thereby strongly compress the compressible material, the wire ring and a cured portion around the wire ring under the mouth plate L. This force is concentrated at a border between the mouth plate and the cylinder head, which results in damaging the curved portion around the wire ring. The curved portion may be broken or partly cut by the force applied to the mouth plate L.

Accordingly, one object of the invention is to provide a steel laminate type cylinder head gasket, which can securely support a mouth plate even if high pressure is applied to the mouth plate.

Another object of the invention is to provide a steel laminate type cylinder head gasket as stated above, which can securely seal around the cylinder bore and the mouth plate while resiliently supporting the mouth plate.

A further object of the invention is to provide a steel laminate type cylinder head gasket as stated above, which can easily and economically manufactured.

Further objects and advantages of the invention will be apparent from the following description of the invention.

SUMMARY OF THE INVENTION

A steel laminate type cylinder head gasket of the invention is installed in an internal combustion engine with an auxiliary combustion chamber. Namely, a cylinder head is provided with a depression for the auxiliary combustion chamber and a mouth plate to close the depression. The gasket is interposed between the cylinder head and a cylinder block, and supports the mouth plate.

The gasket is basically formed of first and second plates extending substantially throughout an entire area of the engine, a compressible member to support the mouth plate, sealing means around a cylinder bore for sealing therearound, and means for supporting the mouth plate adjacent the sealing means.

The first plate includes a first hole corresponding to the cylinder bore of the engine, and a second hole situated adjacent to the first hole and located under a part of the mouth plate. The second hole is defined by a first curved line located adjacent to and at a predetermined distance away outwardly from a part of a contour of the mouth plate, and a second line located adjacent to and at a predetermined distance away from a part of a contour of the cylinder bore. The compressible member is located in the second hole to support the mouth plate.

A curved portion or an elongated strip is defined between the first and second holes. The elongated strip may be integrally formed with the first plate, or separately formed therewith. The supporting means for the mouth plate is situated on or around the elongated strip.

Preferably, the second plate is an upper plate situated above the first plate and includes a curved portion situated around a third hole for the cylinder bore, and a flange extending in a direction away from the third hole. Also, a third plate is situated under the first plate. The flange of the second plate is located under an edge portion of a hole of the third plate. A wire ring is used as the sealing means, and is located between the curved portion and the first plate.

In the present invention, the supporting means for the mouth plate is situated near the sealing means so that the supporting means and the sealing means support the mouth plate near the cylinder bore. The supporting means may be a thin metal plate having a size at least equal to a size of the elongated strip, and is laminated over the elongated strip. The thin metal plate may extend around the cylinder bore entirely.

The third plate may include a bead situated under the elongated strip for supporting the same. In this case, the bead and the elongated strip constitute the supporting means. The bead may extend around the cylinder bore and/or the second hole to seal therearound.

In case the elongated strip is formed separately from the first plate, the elongated strip is made of a thick metal plate. The thick metal plate constitutes the supporting means for the mouth plate.

In the present invention, the supporting means is situated between the sealing means and the compressible member. Therefore, in case the mouth plate is strongly urged against the gasket when the engine is started, the gasket is not damaged at all. Also, since the compressible member is situated in the second hole, the mouth plate is supported at a moderate pressure when the gasket is tightened.

DETAILED DESCRIPTION OF PREFERRED EMBODIMENTS

Figure 1:
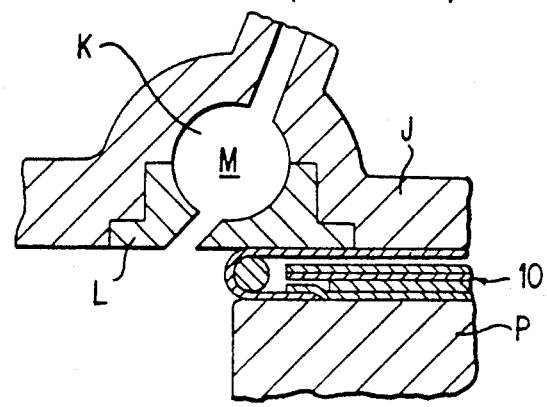
FIG. 1 is an explanatory section view of a conventional gasket installed between a cylinder head and a cylinder block.
Figure 2:
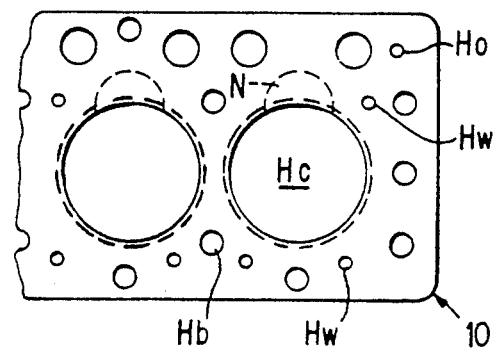
FIG. 2 is a plan view of a part of the conventional gasket shown in FIG. 1.
Figure 3:
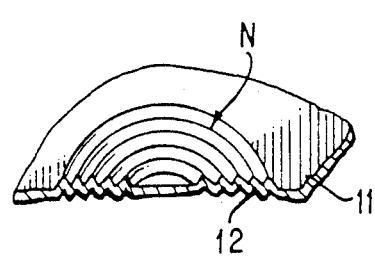
FIG. 3 is a perspective view of a part of a middle plate used in a conventional gasket.
Figure 4:
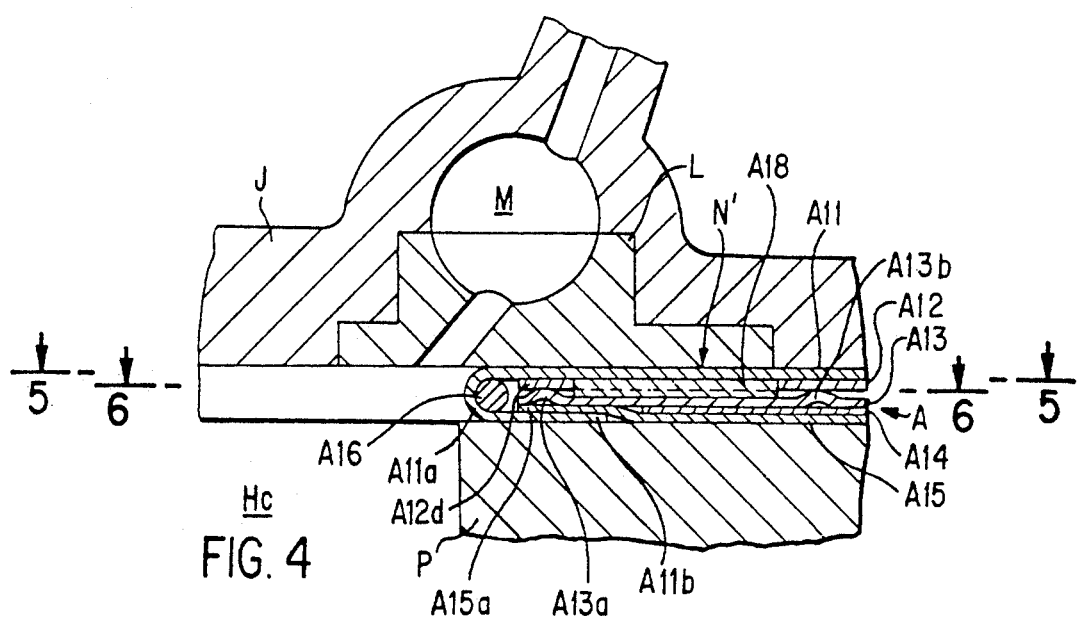
FIG. 4 is an explanatory section view of a first embodiment of a steel laminate gasket of the invention installed between a cylinder head and a cylinder block.
Figure 5:
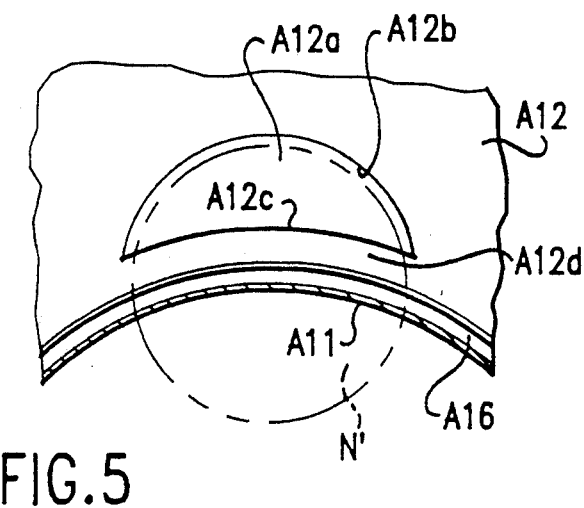
FIG. 5 is a section view taken along line 5—5 in FIG. 4.
Figure 6:
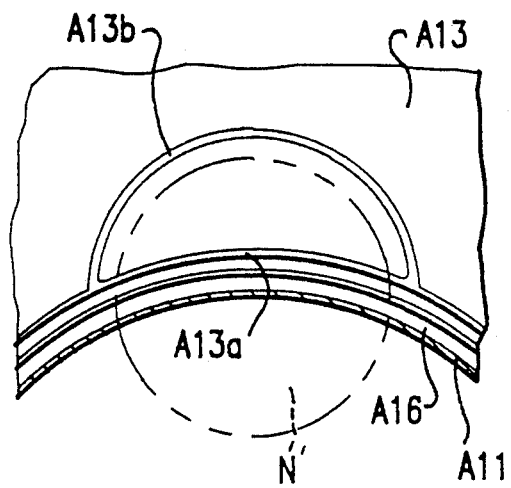
FIG. 6 is a section view taken along line 6—6 in FIG. 4.

Referring to FIGS. 4-6, a first embodiment A of a steel laminate type cylinder head gasket of the invention is shown. The gasket A includes a plurality of cylinder bores Hc, water holes Hw, oil holes Ho, bolt holes Hb and so on, as in the conventional gasket shown in FIG. 2. Since the present invention is directed to a sealing mechanism around the cylinder bore Hc, sealing means for sealing around other holes is not explained. Any sealing means may be used for sealing around other holes.

The gasket A of the invention is installed between a cylinder head J and a cylinder block P. The cylinder head J includes a mouth plate L to form an auxiliary combustion chamber M therein. The mouth plate L is supported by the gasket A at a portion N'.

The gasket A is formed of an upper plate A11, three middle plates A12, A13, A14 and a lower plate A15, which extend substantially throughout the entire area of the engine. A wire ring A16 is situated around the cylinder bore Hc.

The upper plate A11 includes a curved portion A11a to define the cylinder bore Hc, and a flange A11b extending from the curved portion A11a. The wire ring A16 is situated adjacent to the curved portion A11a.

As shown in FIG. 5, the middle plate A12 includes a hole A12a near the cylinder bore Hc. The hole A12a is defined by an outer line A12b larger than a part of a contour of the mouth plate L, and an inner line A12c located at a predetermined distance away from the cylinder bore Hc. A curved elongated portion A12d is, therefore, formed in the middle plate A12 between the cylinder bore Hc and the hole A12a.

A compressible sheet A18 made of graphite is situated in the hole A12a. The thickness of the compressible sheet A18 is greater than that of the plate A12. When the gasket A is tightened, the compressible sheet A18 is compressed to slightly resiliently support the mouth plate L. The compressible sheet A18 does not substantially flow outside the hole A12a.

The middle plate A13 is situated under the middle plate A12 to support the compressible sheet A18 thereon. As shown in FIG. 6, the middle plate A13 includes a bead A13a around the cylinder bore Hc and a bead A13b outside a portion corresponding to the hole A12a. Therefore, the beads A13a, A13b surround the compressible sheet A18 under the middle plate A12 to seal therearound. Particularly, the bead A13a supports the mouth plate L together with the elongated strip A12d.

The middle plate A14 is situated under the middle plate A13, and includes a relatively large hole around the cylinder bore Hc. The middle plate A14 does not overlap the flange A11b. The lower plate A15 is situated under the middle plate A14, and an edge portion A15a of the lower plate A15 is located above the flange A11b.

When the gasket A is situated between the cylinder head J and the cylinder block P and is tightened, the wire ring A16, the beads A13a, A13b and the compressible sheet A18 are compressed. The mouth plate L is slightly resiliently supported by the compressible sheet A18. The bead A13a and the wire ring A16 seal around the cylinder bore Hc and support the mouth plate L, while the beads A13a, A13b seal around the compressible sheet A18.

In the gasket A, the elongated portion A12d is formed between the hole A12a and the cylinder bore Hc, and the bead A13b is located under the elongated portion A12d to extend beyond a portion that the mouth plate L sits. Therefore, the mouth plate L is supported by the elongated portion A12d, the bead A13b and the wire ring A16 as well as the upper plate A11.

Accordingly, even if large force is formed and applied to the mouth plate L when the engine is started or operated, such large force is well supported by the gasket A, especially the elongated portion A12d, the bead A13b and the compressible sheet A18. Therefore, when the engine is started or operated, the mouth plate L does not substantially move, so that the upper plate A11 is not damaged by the mouth plate L. Leakage of combustion gas through the mouth plate L is also prevented.

In the gasket A, the bead A13a extends entirely around the cylinder bore Hc, but the bead A13a may extend partly around the cylinder bore Hc to only surround the hole A12a together with the bead A13b. Leakage through the mouth plate L is also effectively prevented.

Figure 7:
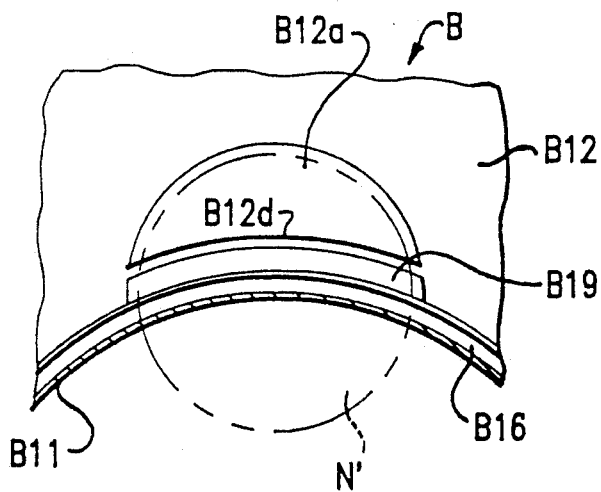
FIG. 7 is a section view, similar to FIG. 5, for showing a second embodiment of the invention.
Figure 8:
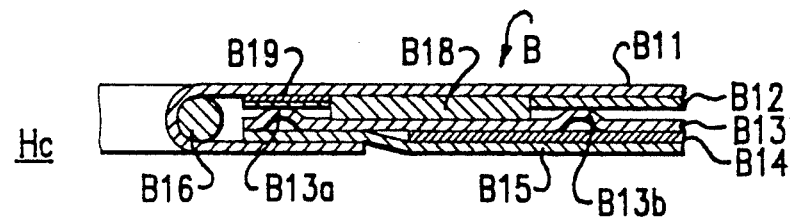
FIG. 8 is a section view, similar to FIG. 4, for showing the second embodiment of a steel laminate gasket of the invention.

FIGS. 7 and 8 show a second embodiment B of a steel laminate type cylinder head gasket of the invention. The gasket B is formed of an upper plate B11, a middle plate B12 with a hole B12a and an elongated portion B12d, a middle plate B13 with beads B13a, B13b, a middle plate B14, a lower plate B15, and a wire ring B16, as in the gasket A.

However, the gasket B further includes an elongated curved member B19 situated on the elongated portion B12d to strengthen the elongated portion B12d. The elongated curved member B19 may be situated on a different place, such as under the bead B13a. The elongated curved member B19 is made of a thin metal plate and extends slightly beyond the mouth plate L.

In the gasket B, the elongated curved member B19, the elongated portion B12d, the wire ring B16 and a compressible sheet B18 support the mouth plate L. The gasket B operates as in the gasket A.

Figure 9:
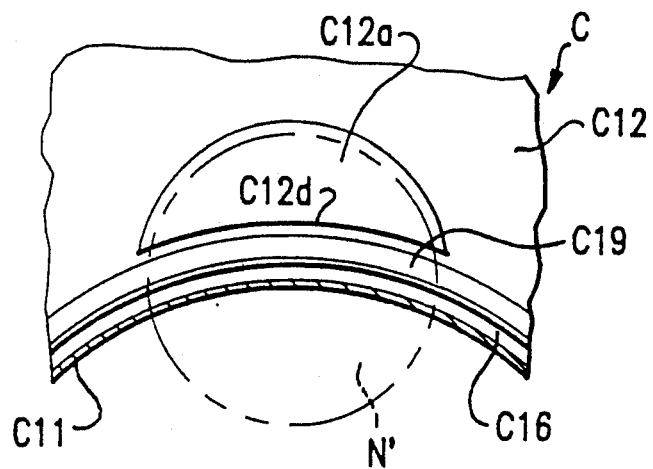
FIG. 9 is a section view, similar to FIG. 5, for showing a third embodiment of the invention.

FIG. 9 shows a third embodiment C of a steel laminate type cylinder head gasket of the invention. The gasket C is formed of an upper plate C11, three middle plates C12, C13, C14, a lower plate C15, and a wire ring C16, as in the gasket B. In the gasket C, however, an annular ring C19 is situated above the elongated portion C12d to entirely surround the cylinder bore Hc. In the gasket C, sealing ability around the cylinder bore Hc is improved. The gasket C operates as in the gasket B.

Figure 10:
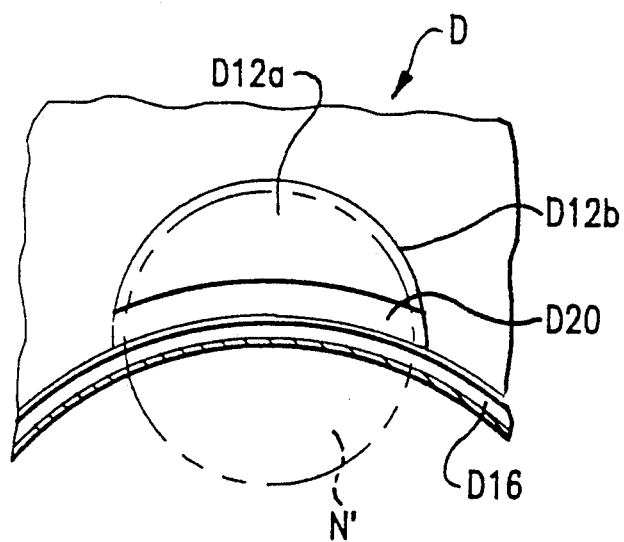
FIG. 10 is a section view, similar to FIG. 5, for showing a fourth embodiment of the invention.
Figure 11:
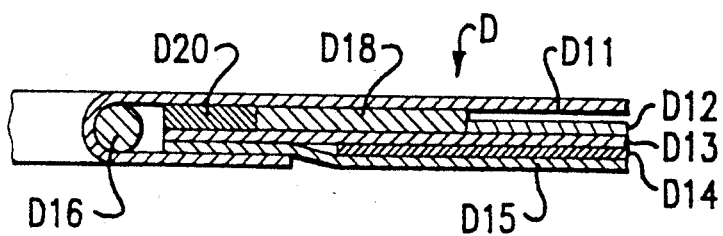
FIG. 11 is a section view, similar to FIG. 4, for showing the fourth embodiment of the invention.

FIGS. 10 and 11 show a fourth embodiment D of a steel laminate type cylinder head gasket of the invention. The gasket D is formed of an upper plate D11, three middle plates D12, D13, D14, a lower plate D15, and a wire ring D16, as in the gasket A.

In the gasket D, however, the middle plate D12 is provided with a hole or concave D12a surrounded by a line D12b only. Namely, there is no elongated portion, like the portion A12d as shown in FIG. 5. Instead, a thick metal member D20 is situated to separate the hole D12a form the cylinder bore Hc.

In the gasket D, the thick metal member D20, the wire ring D16 and a compressible sheet D18 support the mouth plate L. The gasket D operates as in the gasket A.

In the gasket of the present invention, a hole is formed adjacent to a cylinder bore, in which a compressible sheet is provided. A supporting member is formed in an elongated portion or a curved portion between the hole and the cylinder bore to support the mouth plate. Accordingly, force applied to the mouth plate is not concentrated only one plate or portion, so that an outer plate of the gasket is not substantially damaged by the mouth plate.

While the invention has been explained with reference to the specific embodiments of the invention, the explanation is illustrative and the invention is limited only by the appended claims.

What is claimed is:

1. A steel laminate type cylinder head gasket to be installed in an internal combustion engine having a cylinder block with a cylinder bore, a cylinder head with an auxiliary combustion chamber and a mouth plate attached to the cylinder head for defining the auxiliary combustion chamber, comprising:
   a first plate extending substantially throughout an entire area of the gasket, said first plate having a first hole corresponding to the cylinder bore of the engine, a second hole situated adjacent to the first hole under a part of the mouth plate, said second hole being defined by a first curved line located adjacent to and at a predetermined distance away from a part of a contour of the mouth plate and a second line located adjacent to and at a predetermined distance away from the cylinder bore, and an elongated strip formed between the first and second holes,
   a compressible member situated in the second hole to support the mouth plate,
   sealing means formed around the cylinder bore to seal therearound,
   means for supporting the mouth plate adjacent to the sealing means so that the supporting means and the sealing means support the mouth plate near the cylinder bore, and
   a second plate situated adjacent to the first plate to form a steel laminate gasket.

2. A steel laminate type cylinder head gasket according to claim 1, wherein said second plate is an upper plate situated above the first plate, said second plate including a third hole corresponding to the cylinder bore of the engine, a curved portion situated around the third hole, and a flange extending in a direction away from the third hole to be located under the first plate.

3. A steel laminate type cylinder head gasket according to claim 2, further comprising a third plate situated under the first plate, said third plate having a fourth hole with an edge portion, said edge portion being located between the flange and the elongated strip of the first plate.

4. A steel laminate type cylinder head gasket according to claim 3, wherein said elongated strip is integrally formed with the first plate.

5. A steel laminate type cylinder head gasket according to claim 4, wherein said sealing means is a wire ring situated between the curved portion and the first plate.

6. A steel laminate type cylinder head gasket according to claim 4, wherein said third plate includes a first bead situated along and at a predetermined distance away from the first curved line outwardly, and a second bead situated under the elongated strip, said second bead together with the elongated strip constituting the supporting means of the mouth plate, said first and second beads being interconnected together.

7. A steel laminate type cylinder head gasket according to claim 6, wherein said second bead extends around the entire cylinder bore.

8. A steel laminate type cylinder head gasket according to claim 4, wherein said supporting means is a thin metal plate having a size at least equal to a size of the elongated strip, said thin metal plate being laminated over the elongated strip.

9. A steel laminate type cylinder head gasket according to claim 8, wherein said third plate includes a first bead situated along and at a predetermined distance away from the first curved line outwardly, and a second bead situated under the elongated strip, said second bead and thin metal plate together with the elongated strip constituting the supporting means of the mouth plate, said first and second beads being interconnected together.

10. A steel laminate type cylinder head gasket according to claim 8, wherein said thin metal plate extends around the entire cylinder bore.

11. A steel laminate type cylinder head gasket according to claim 3, wherein said elongated strip is formed separately from the first plate and is made of thick metal plate to constitute the supporting means.

12. A steel laminate type cylinder head gasket according to claim 3, wherein said compressible member is basically formed of graphite.

* * * * *